(12) United States Patent
Bhan et al.

(10) Patent No.: US 12,236,451 B2
(45) Date of Patent: *Feb. 25, 2025

(54) METHOD AND SYSTEM OF ENGAGING A TRANSITORY SENTIMENT COMMUNITY

(71) Applicant: HIWAVE TECHNOLOGIES INC., Toronto (CA)

(72) Inventors: Vaibhav Bhan, Toronto (CA); Joe Lai, Toronto (CA)

(73) Assignee: HIWAVE TECHNOLOGIES INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,714

(22) Filed: Feb. 9, 2023

(65) Prior Publication Data

US 2023/0267502 A1    Aug. 24, 2023

Related U.S. Application Data

(63) Continuation-in-part of application No. 17/204,324, filed on Mar. 17, 2021, now Pat. No. 11,605,004, which is a continuation-in-part of application No. 16/216,038, filed on Dec. 11, 2018, now Pat. No. 11,030,533.

(51) Int. Cl.
*G06F 17/30*    (2006.01)
*G06Q 30/0251*    (2023.01)

(52) U.S. Cl.
CPC ............... *G06Q 30/0251* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 10,372,741 B2 * | 8/2019 | Mathew | G06F 40/237 |
| 10,410,125 B1 * | 9/2019 | Finkelstein | G06N 7/01 |
| 10,410,273 B1 * | 9/2019 | Finkelstein | G06N 7/01 |
| 10,437,912 B2 * | 10/2019 | Berube | G06F 16/958 |
| 10,693,996 B2 * | 6/2020 | Gao | H04L 67/62 |
| 10,896,428 B1 * | 1/2021 | Balasubramaniam | G10L 15/1815 |
| 11,080,723 B2 * | 8/2021 | Rashid | G06Q 30/0201 |
| 11,587,172 B1 * | 2/2023 | Guzman | G06Q 30/02 |
| 2008/0215607 A1 * | 9/2008 | Kaushansky | G06Q 30/02 707/999.102 |
| 2009/0265332 A1 * | 10/2009 | Mushtaq | G06Q 30/0245 707/999.005 |

(Continued)

Primary Examiner — Hung D Le

(57) ABSTRACT

A method and system, performed in a processor of a server computing device, of engaging a transitory sentiment community. The method comprises identifying, responsive to monitoring generation of the transitory sentiment community, a critical engagement juncture being reached, the transitory sentiment community including a collective of content consumers, the collective of content consumers providing a sentiment expressive usage associated with a subject of interest, the sentiment expressive usage characterized in accordance with a sentiment intensity rating, and initiating, responsive to the critical engagement juncture being reached, an engagement action directed to at least a subset of the collective of content consumers.

14 Claims, 10 Drawing Sheets

(56) References Cited

U.S. PATENT DOCUMENTS

| | | | |
|---|---|---|---|
| 2010/0088154 A1* | 4/2010 | Vailaya | G06Q 30/0251 705/7.29 |
| 2012/0209919 A1* | 8/2012 | Shah | G06Q 30/0251 709/205 |
| 2012/0290950 A1* | 11/2012 | Rapaport | H04L 12/1818 715/753 |
| 2014/0019443 A1* | 1/2014 | Golshan | G06F 16/9535 707/723 |
| 2014/0101247 A1* | 4/2014 | Pappas | H04L 67/535 709/204 |
| 2015/0149153 A1* | 5/2015 | Werth | G06F 40/30 704/9 |
| 2015/0206153 A1* | 7/2015 | Lee | G06Q 50/01 705/7.29 |
| 2015/0248409 A1* | 9/2015 | Berube | G06F 16/958 707/752 |
| 2016/0343004 A1* | 11/2016 | Brink | G06Q 30/0201 |
| 2017/0124575 A1* | 5/2017 | Clark | G06F 16/24578 |
| 2017/0235792 A1* | 8/2017 | Mawji | G06F 16/9538 707/769 |
| 2017/0249389 A1* | 8/2017 | Brovinsky | G06Q 30/02 |
| 2017/0308523 A1* | 10/2017 | Wang | G06F 40/232 |
| 2017/0364797 A1* | 12/2017 | Pal | G06N 3/08 |
| 2018/0018318 A1* | 1/2018 | Majumder | G06Q 50/01 |
| 2018/0018321 A1* | 1/2018 | Jones | G06F 40/30 |
| 2018/0114238 A1* | 4/2018 | Treiser | G06F 16/88 |
| 2018/0165582 A1* | 6/2018 | Cha | H04L 51/52 |
| 2018/0331990 A1* | 11/2018 | Bastide | H04L 51/046 |
| 2019/0124023 A1* | 4/2019 | Conroy | G06N 7/01 |
| 2019/0171660 A1* | 6/2019 | Kershaw | G06F 40/30 |
| 2020/0065716 A1* | 2/2020 | Aharonov | G06N 20/00 |
| 2020/0073485 A1* | 3/2020 | Al-Halah | G06F 16/5846 |
| 2020/0106854 A1* | 4/2020 | Gao | H04L 67/62 |
| 2020/0133238 A1* | 4/2020 | Geiselhart | G06F 40/30 |
| 2021/0224817 A1* | 7/2021 | Prendki | G06Q 30/0631 |

* cited by examiner

500

```
┌─────────────────────────────────────────────┐
│ Receiving data, in a database memory associated with │
│ a server computing device, the data extracted from a │
│ plurality of data sources                            │
│                                                  510 │
└─────────────────────────────────────────────┘
                        │
                        ▼
┌─────────────────────────────────────────────┐
│ Pre-processing the data, in a processor of the server │
│ computing device, based on at least one of text       │
│ character removal and text character replacement, to  │
│ provide pre-processed data that includes a set of     │
│ keywords used in a descriptive manner             520 │
└─────────────────────────────────────────────┘
                        │
                        ▼
┌─────────────────────────────────────────────┐
│ Performing a sentiment analysis on the set of          │
│ keywords based at least in part upon a training model, │
│ the sentiment analysis identifying: (i) a conformance  │
│ to at least one sentiment classification of a set of   │
│ sentiment classifications recognized by the training   │
│ model, and (ii) a sentiment intensity rating associated│
│ with the conformance                              530  │
└─────────────────────────────────────────────┘
                        │
                        ▼
┌─────────────────────────────────────────────┐
│ Modifying the sentiment intensity rating associated │
│ with the at least one sentiment classification upon │
│ detecting a sarcasm sentiment that is above a       │
│ sarcasm sentiment likelihood threshold              │
│                                                 540 │
└─────────────────────────────────────────────┘
                        │
                        ▼
┌─────────────────────────────────────────────┐
│ Generating the transitory sentiment community based │
│ at least in part on the at least one sentiment      │
│ classification and the modified sentiment intensity │
│ rating                                              │
│                                                 550 │
└─────────────────────────────────────────────┘
```

Identifying, in accordance with a supervised trained model, within agglomerated social media content data, content associated with a subject of interest and characterized in accordance with one of a sentiment expressive usage and not a sentiment expressive usage, the subject of interest defined in accordance with at least one text character string
710

Performing, based on an unsupervised trained model in conjunction with content associated with the sentiment expressive usage, a sentiment analysis that determines a sentiment intensity rating associated with at least a portion of the agglomerated social media content data
720

Generating the transitory sentiment community based at least in part on the sentiment intensity rating

Identifying, responsive to monitoring generation of a transitory sentiment community, a critical engagement juncture being reached, the transitory sentiment community including a collective of content consumers, the collective of content consumers providing a sentiment expressive usage associated with a subject of interest, the sentiment expressive usage characterized in accordance with a sentiment intensity rating

1010

Initiating, responsive to the critical engagement juncture being reached, an engagement action directed to at least a subset of the collective of content consumers

METHOD AND SYSTEM OF ENGAGING A TRANSITORY SENTIMENT COMMUNITY

TECHNICAL FIELD

The disclosure herein relates to generating a transitory networked sentiment community.

RELATED APPLICATIONS

This application claims benefit of priority to U.S. patent application Ser. No. 17/204,324 filed Mar. 17, 2021 now issued as U.S. Pat. No. 11,605,004, which in turn claims benefit of priority to U.S. patent application Ser. No. 16/216,038 filed Dec. 11, 2018 now issued as U.S. Pat. No. 11,030,533. Said U.S. patent application Ser. Nos. 17/204,324 and 16/216,038 are incorporated in the entirety herein.

BACKGROUND

Current techniques associate social connections of a user that can be used effectively for purposes such as promoting products and services or for making personalized interactions in a system. Such approaches may lack a system that can collect and interpret necessary information without limitations based literal interpretations of the information as collected, while respecting privacy rights of individuals.

BRIEF DESCRIPTION OF THE DRAWINGS

FIG. 5 illustrates, in an example embodiment, a method of operation in generating a transitory sentiment community.

FIG. 7 illustrates an example embodiment of a method of operation in generating a transitory sentiment community.

FIG. 10 illustrates an example embodiment of a method of operation in engaging a transitory sentiment community.

DETAILED DESCRIPTION

Figure 1:
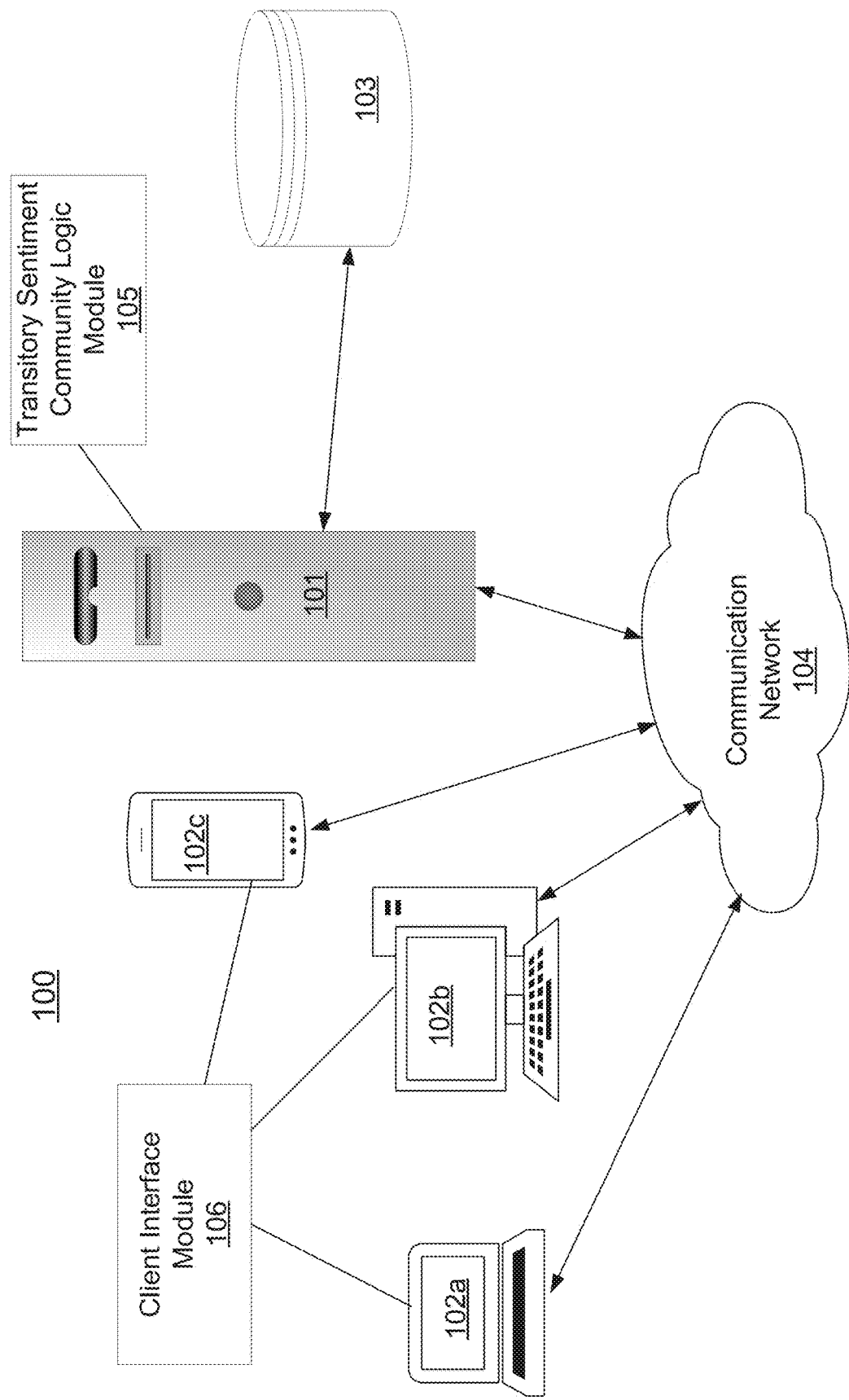
FIG. 1 illustrates, in an example embodiment, a server-based system for generating a transitory sentiment community.

Among other technical advantages and benefits, solutions provided herein provide a system that generates and captures a transitory sentiment community at a server computing device. The transitory nature of the sentiment community as generated ebbs and flows, being created or deleted in accordance with threshold sentiment parameters that define the creating or deleting of the transitory sentiment community. In some embodiments as suited for an ad hoc purpose, the transitory sentiment community may be based on collective sentiment or emotion inferred from posted content using a linguistic framework, allowing for real-time, fluid monitoring of such sentiment community in accordance with its transitory nature, while respecting individual privacy rights associated with content sources.

In accordance with a first example embodiment, a method of generating a transitory sentiment community. The method comprises receiving data, in a database memory associated with a server computing device, the data extracted from a plurality of data sources, pre-processing the data, in a processor of the server computing device based on at least one of text character removal and text character replacement, to provide pre-processed data that includes a set of keywords used in a descriptive manner, performing a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance, modifying the sentiment intensity rating associated with the at least one sentiment classification upon detecting a sarcasm sentiment that is above a sarcasm sentiment likelihood threshold, and generating the transitory sentiment community based at least in part on the at least one sentiment classification and the modified sentiment intensity rating.

In accordance with a second example embodiment, also provided is a server computing system for generating a transitory sentiment community. The server computing system comprises a processor and a memory storing a set of instructions. The instructions are executable in the processor to receive data, in a database memory associated with a server computing device, the data extracted from a plurality of data sources, pre-process the data, in a processor of the server computing device, based on at least one of text character removal and text character replacement, to provide pre-processed data that includes a set of keywords used in a descriptive manner, perform a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance, modify the sentiment intensity rating associated with the at least one sentiment classification upon detecting a sarcasm sentiment that is above a sarcasm sentiment likelihood threshold, and generate the transitory sentiment community based at least in part on the at least one sentiment classification and the modified sentiment intensity rating.

In accordance with a third example embodiment, a non-transitory memory medium storing instructions executable in a processor of a computing device is provided. The instructions are executable to receive data, in a database memory associated with a server computing device, the data extracted from a plurality of data sources, pre-process the data, in a processor of the server computing device, based on at least one of text character removal and text character replacement, to provide pre-processed data that includes a set of keywords used in a descriptive manner, perform a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance, modify the sentiment intensity rating associated with the at least one sentiment classification upon detecting a sarcasm sentiment that is above a sarcasm sentiment likelihood threshold, and generate the transitory sentiment community based at least in part on the at least one sentiment classification and the modified sentiment intensity rating.

In one aspect, provided is a method, performed in a processor of a server computing device, of generating a transitory sentiment community. The method comprises identifying, in accordance with a supervised trained model, within agglomerated social media content data, content associated with a subject of interest and characterized in accordance with one of a sentiment expressive usage and not a sentiment expressive usage, the subject of interest defined in accordance with at least one text character string; performing, based on an unsupervised trained model in conjunction with content associated with the sentiment expressive usage, a sentiment analysis that determines a sentiment intensity rating associated with at least a portion of the agglomerated social media content data, and generating the transitory sentiment community based at least in part on the sentiment intensity rating.

In yet another aspect, provided is a server computing system that includes a processor and a non-transitory memory storing instructions executable in the processor. The instructions, when executed in the processor, cause operations comprising identifying, in accordance with a supervised trained model, within agglomerated social media content data, content associated with a subject of interest and characterized in accordance with one of a sentiment expressive usage and not a sentiment expressive usage, the subject of interest defined in accordance with at least one text character string; performing, based on an unsupervised trained model in conjunction with content associated with the sentiment expressive usage, a sentiment analysis that determines a sentiment intensity rating associated with at least a portion of the agglomerated social media content data, and generating the transitory sentiment community based at least in part on the sentiment intensity rating.

In another aspect, provided is a non-transitory memory storing instructions. The instructions are executable in a processor and when executed, cause operations comprising identifying, in accordance with a supervised trained model, within agglomerated social media content data, content associated with a subject of interest and characterized in accordance with one of a sentiment expressive usage and not a sentiment expressive usage, the subject of interest defined in accordance with at least one text character string; performing, based on an unsupervised trained model in conjunction with content associated with the sentiment expressive usage, a sentiment analysis that determines a sentiment intensity rating associated with at least a portion of the agglomerated social media content data, and generating the transitory sentiment community based at least in part on the sentiment intensity rating.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device.

Furthermore, one or more embodiments described herein may be implemented through the use of logic instructions that are executable by one or more processors of a computing device, including a server computing device. These instructions may be carried on a computer-readable medium. In particular, machines shown with embodiments herein include processor(s) and various forms of memory for storing data and instructions. Examples of computer-readable mediums and computer storage mediums include portable memory storage units and flash memory (such as carried on smartphones). A server computing device as described herein utilizes processors, memory, and logic instructions stored in the memory or computer-readable medium. Embodiments described herein may be implemented in the form of computer processor-executable logic instructions or programs stored on computer-readable memory mediums.

System Description

FIG. 1 illustrates, in an example embodiment, transitory sentiment community logic module 105 hosted at server computing device 101, within cloud networked system 100 for software application execution with concurrent signaling. While server computing device 101 may include transitory sentiment community logic module 105 as depicted, it is contemplated that, in alternate embodiments, computing devices 102*a-c*, including desktop workstations, laptop computers, and mobile computing devices 102-*c* in communication via network 104 with server 101, may include one or more sub-modules or portions that constitute transitory sentiment community logic module 105 as embodied in computer processor-executable instructions stored within a non-transitory computer readable memory. Database 103 may be communicatively accessible to server computing device 101 (also referred to as server 101 herein) and also to one or more of client computing devices 102*a-c* (collectively referred to herein as client computing device 102) via communication network 104.

Client computing devices 102*a-c* may be configured to include client interface module 106 constituted of processor-executable instructions, allowing interaction by a user at client computing devices 102*a-c* with results generated from, or in conjunction with, transitory sentiment community logic module 105 at server 101. In one embodiment, client interface module 106 includes processor-executable instructions or a software application downloadable from server computing device 101 and configured to operate in conjunction with transitory sentiment community logic module 105 to allow physical user interface representations of the sentiment community at client computing device 102. It is contemplated that, in alternate embodiments, client interface module 106 may include one or more sub-modules or portions that constitute transitory sentiment community logic module 105 as embodied in computer processor-executable instructions stored within a non-transitory computer readable memory, and executable in a processor of client device 102.

Figure 2:
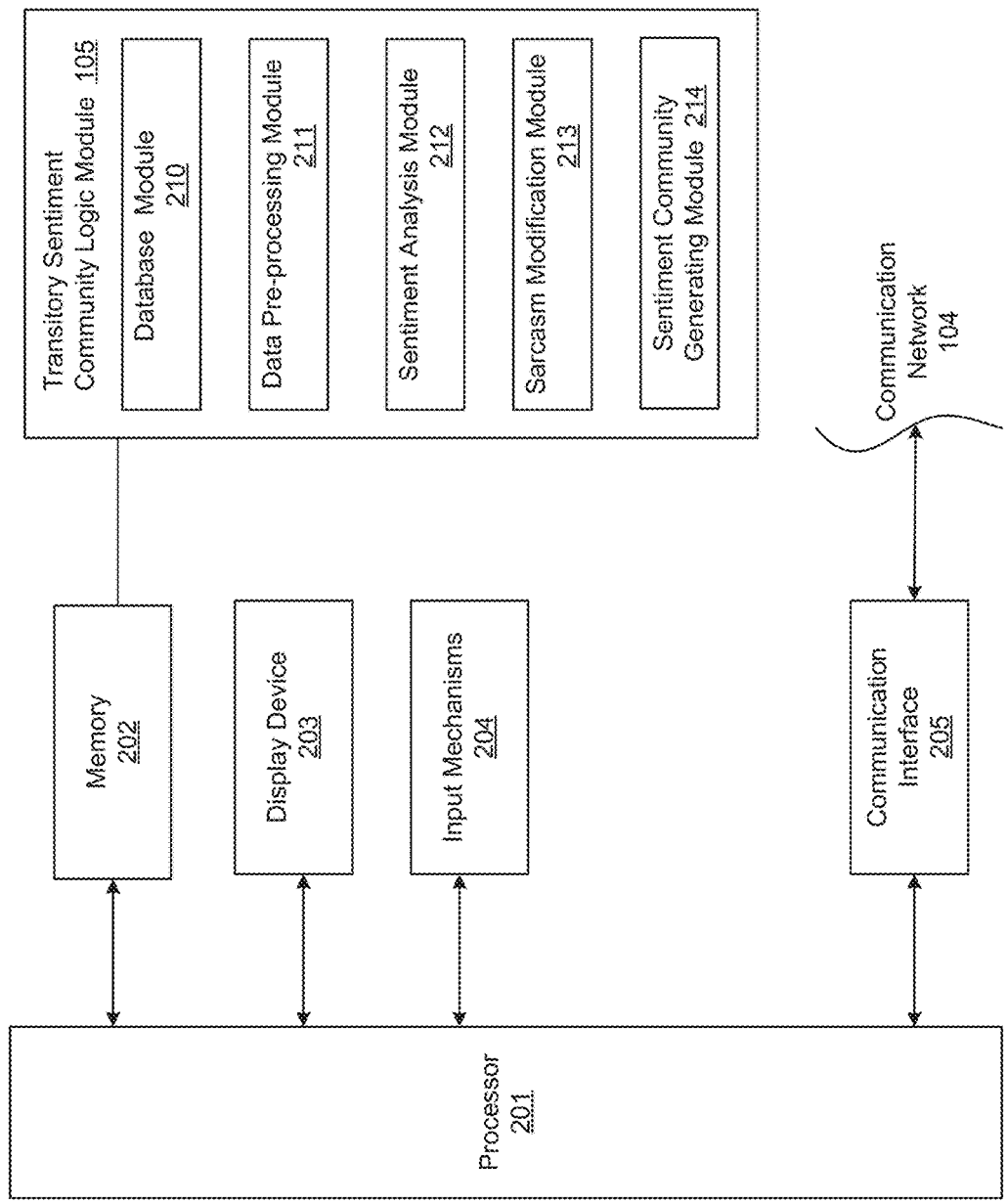
FIG. 2 illustrates, in one example embodiment, an architecture of a computing system for generating a transitory sentiment community.

FIG. 2 illustrates architecture 200 of server computing device 101 hosting transitory sentiment community logic module 105, in an example embodiment. Server computing device 101 may include processor 201, non-transitory computer readable memory 202 that includes transitory sentiment community logic module 105, display screen 203, input mechanisms 204 such as a keyboard or software-implemented touchscreen input functionality, and communication interface 207 for communicating with client devices 102*a-c* via communication network 104.

Transitory sentiment community logic module 105 includes instructions stored in memory 202 of server 101, the instructions configured to be executable in processor 201. Sentiment community logic module 105 may comprise portions or sub-modules including database module 210, data pre-processing module 211, sentiment analysis module 212, sarcasm modification module 213 and sentiment community generating module 214.

Database module 210, in an embodiment, includes instructions executable in processor 201 in association with database module 210 to receive data, in a database memory associated with server computing device 101, the data extracted from a plurality of data or content sources.

Data pre-processing module 211, in an embodiment, includes instructions executable in processor 201 to pre-process the extracted data or content, based on at least one of text character removal and text character replacement, to provide pre-processed data that includes a set of keywords used in a descriptive manner.

Sentiment analysis module 212, in an embodiment, includes instructions executable in processor 201 to perform a sentiment analysis on the set of keywords, based at least in part upon a training model, to: (i) a identify a conformance to at least one sentiment classification of a set of sentiment classifications recognized by the training model, and (ii) derive a sentiment intensity rating associated with the conformance. In some example embodiments, sentiment classifications or labels may represent sentiments or emotions, in addition to a "sarcasm" or "sarcastic" sentiment or emotion, as any one or more of "anger", "disgust", "fear", "joy", "sadness", "surprise", "trust", "anticipation", "distrust", "satisfied", "dissatisfied", "disappointed", "delighted". It is contemplated that descriptions, classifications, labels and representations of sentiments or emotions may not be limited to only the latter examples, and furthermore, need not be limited to any particular form of, or conformance with, particular grammatical forms in accordance with tenses, verbs, nouns, or adjectives.

Sarcasm modification module 213, in one embodiment, includes instructions executable in processor 201 to modify the sentiment intensity rating associated with the at least one sentiment classification of the sentiment classifications recognized by a training model upon detecting a sarcasm sentiment that is above a sarcasm sentiment likelihood threshold. The sarcasm sentiment may be associated with a statistical likelihood that the set of keywords pertain to sarcasm based in art on the author of the underlying content. In one embodiment the sarcasm sentiment likelihood threshold may be expressed as a statistical confidence level threshold value, above which threshold value a sarcasm sentiment is established as detected.

Sentiment community generating module 214, in one embodiment, includes instructions executable in processor 201 to generate the transitory sentiment community based at least in part on the sentiment classification and the modified sentiment intensity rating in accordance with applying sarcasm sentiment module 213.

Figure 3:
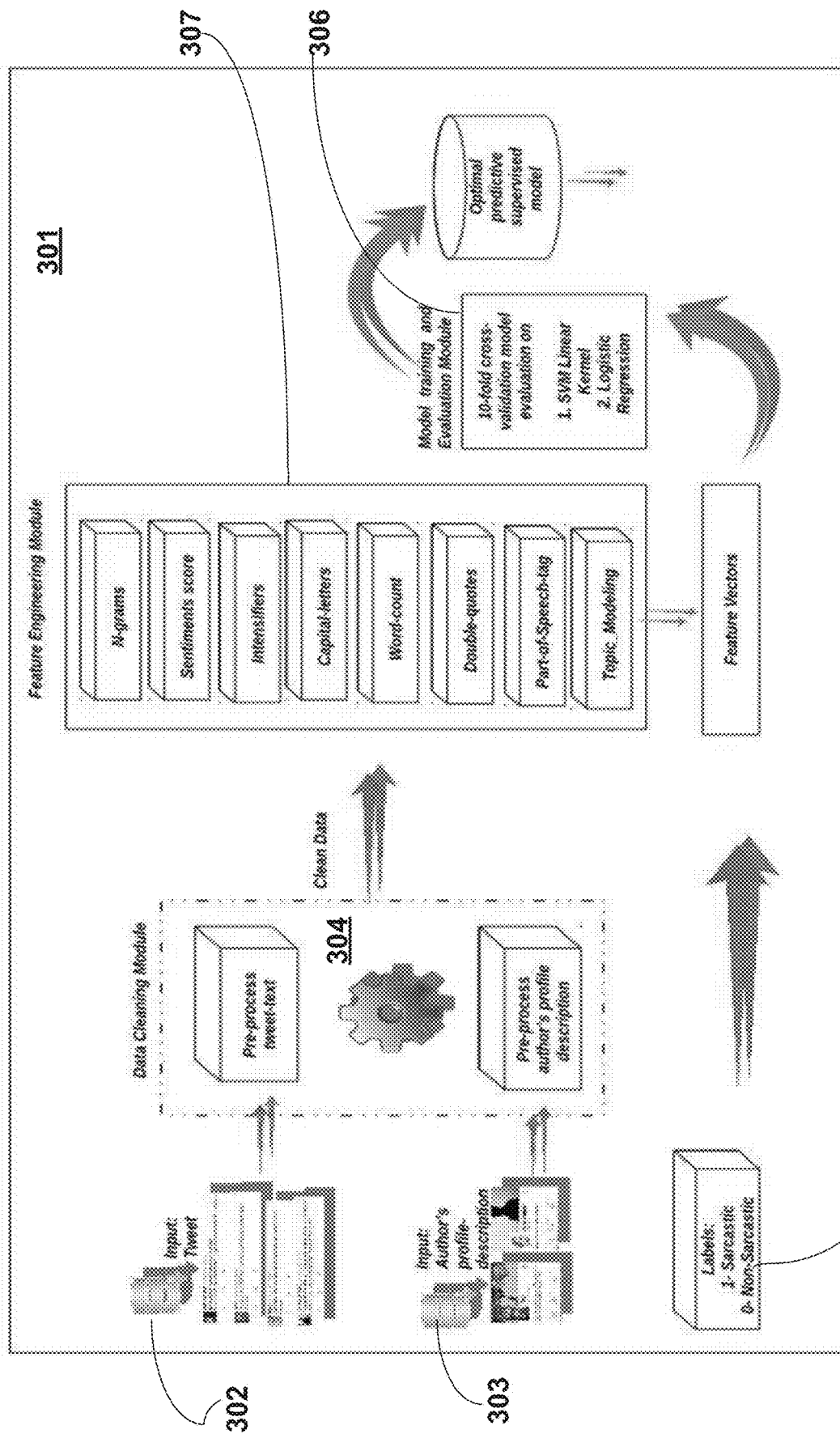
FIG. 3 illustrates, in an example embodiment, a linguistic framework including a sarcasm sentiment module.

FIG. 3 illustrates, in an example embodiment, linguistic framework 301 that includes author profile component 303, pre-processing component 304 which includes author profile pre-processing functions, and sarcasm identification component 305 of sarcasm sentiment module 213 for modifying a sentiment intensity rating associated with an identified sentiment class. The identified sentiment class may be one, or more than one in alternate embodiments, of a set of sentiment or emotion classifications recognized by training model 306.

Data source input component 302 provides input data to database module 210 to receive data in memory 202 or a database memory 103 associated with server computing device 101, the data being extracted from a plurality of data sources. The data sources comprise publicly available data such as, but not limited to, tweet content, instant messaging content, product review content, service review content, social media posting content, and website content.

Data gathered from content sources may be stored in an OrientDB open source NoSQL graph database in one embodiment, allowing flexibility, scalability, rapid scaling of data, providing advantages in query optimization, including use of lightweight edges and indexes that improves the speed of data retrieval. Data objects may be stored as nodes, with corresponding relationships represented as edges. Each node has unique properties depending on the source, but most nodes share common properties including user ID, create date, text, source, sentiment, category, and emotion parameters. Edges that connect the nodes show the relationship between nodes. Some edges have their own properties (regular edges) while others do not (lightweight edges).

General database optimization and tuning techniques may be applied to further improve database performance, such as indexing techniques applied to ensure advantageous balance between quick database access and disk space, with lightweight edges incorporated to improve performance and memory usage.

Feature engineering component 307 of linguistic framework 301 provides features and operations to be applied upon pre-processed, or cleaned, data of data cleaning module 304.

Figure 4:
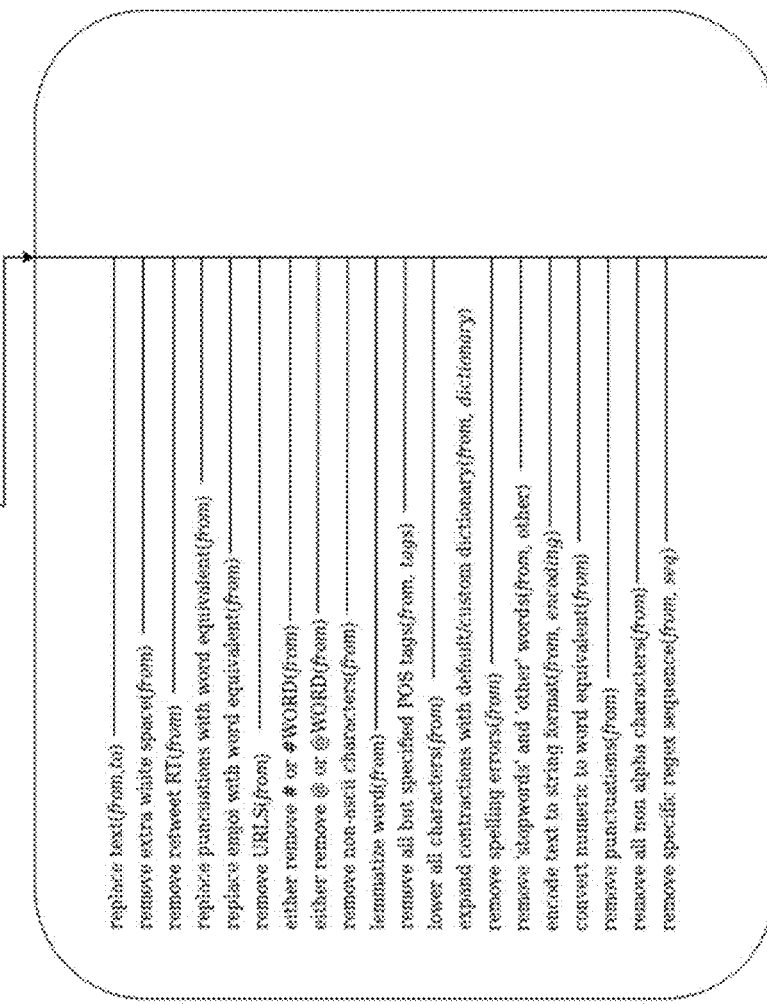
FIG. 4 illustrates an example embodiment of pre-processing data in generating a transitory sentiment community.

FIG. 4 illustrates an example embodiment 401 in exemplary detail related to pre-processing data in generating a transitory sentiment community, showing pre-processing operations performed on content, including text removal and text replacement operations.

In an embodiment that implements topic extraction operations, the a topic model based on dirilecht distributions and multinomial may be used to provide classification and general understanding of latent topics within the data content, such as a review of a product or service. In an embodiment, prior knowledge of topic-word distribution may be sued to provide an initialization to the starter distributions when selecting topic per word and to the data content item as well. This process of initializing the likelihood based on prior words may be incorporated into an online dirilecht-based technique. Creating the prior knowledge of topic-word distribution may be done manually for each use case to provide custom priors and allow for a guided latent Dirichlet allocation (LDA) approach which specializes in learning topics for a specific domain. To further improve and to be able to re-incorporate the priors we allow for constant reminder of prior information to stay within the model through the alpha and beta parameters of the LDA model. These two parameters in the online LDA algorithm allow the priors to maintain relevant throughout the inference and training processes. To calculate an optimal alpha beta contribution factor of regression analysis may be used to calculate alpha and beta parameters separated by combinations of prior knowledge and a set of coefficients.

Topic relevance ranking may be incorporated rank the words which describe each latent topic. An after-training analysis of the model and come with up relevancy and saliency scoring metrics. Adoption of these metrics allows for ranking of topic words, topic separation, and topic dominance. Attaching the new relevance metrics to online LDA with priors provide a unique and enhanced tool for topic analysis with quality measures. For topic optimization, topic modeling methods generate multinomial topic distribution in which each topic is a set of uni-gram tokens with a probability that determines how frequent each word appears in a text. In order to have more understandable topics, uni-gram tokens may be replaced with high quality phrases.

In one embodiment, a set of candidate labels may be extracted from the reference corpus. Then a relevancy score assigned to each candidate label. To score candidate labels, Kullback-Leibler divergence may be applied to find similarity between distribution of words in a topic and distribution of words in a label. Candidate labels may be ranked with respect to each topic model and top ranked labels selected to label the corresponding topic(s), a good label being denoted as having high semantic relevance to the target topic, and low semantic relevance to other topics.

Next in regard to topic related sentiment or emotion analysis, a pre-trained model 306 may be used to capture char embeddings is a new tactic in linguistic-based models. To further the model to high accuracies, a specialized set of keywords may identified and applied to gather training data for each of a set of emotions or sentiments. Using the list of keywords for each emotion training data may be extracted from content sources. The data was cleaned prior to training to ensure the keywords were used in a descriptive manner. Additionally, trained models may be incorporated to implement a full artificial intelligence (AI)-based teacher-student model. Such AI teachers may be implemented to select training data with high degree of confidence to be used to further train the emotion or sentiment model. To generate meaningful phrases as candidate labels from reference collection, chunking parser methods may be used to extract noun phrases. Labels which contain more important words (higher probability) in the topic distributions are considered as good labels. Multinomial distribution of topics found with online LDA (with setting priors as guided LDA) may be then matched with the top-ranked candidate labels which have high relevance score to each individual topic.

Next with regard to the particular sentiment of sarcasm, sentiment-based models may fail when sarcasm is involved in the input data content, for example, in tweets. Sarcasm detection can help in gaining a better insight into customer sentiments. As incorporated into sarcasm modification module model 213 for sarcasm sentiment detection and sentiment intensity modification, features may be analyzed from tweets and their description in order to capture the sarcasm expressed in tweets, for example. Further in reading to online content postings including tweets, registered authors on have the opportunity to provide a personal profile or self-description. Such self-description or author profile data may be used to extract information about personality traits of content authors, to enable or help in classifying sarcastic tweets from non-sarcastic ones with a high degree of accuracy. In one example embodiment, a range of different feature-sets from tweet-text in conjunction with author's self-description may be engineer using LinearSVM and Logistic Regression predictive models. Further, lexical-based features 307 of linguistic framework 301 may be generated from review text such as n-grams, intensifiers, number of capital letter words, binary feature for double quotes, count of part-of-speech to name a few, as such features help in capturing the nuances of the writing style of a content author, such as Twitter users. Sentiment-based features may also be generated from the content. Positive, negative and difference in sentiment score, for example from different parts of the review text, are captured as features. This feature enables detection of a degree contrast of sentiment in a sarcasm. Topic-modeling based features may be captured from the user profile description by applying the topic modeling technique. Such feature is based on the presumption that the author's self-description can give a better idea of an inclination towards sarcasm.

In an embodiment, a slang related sentiment may be detected and applied to modify, such as by amplifying or attenuating, the sentiment intensity rating upon detecting existence of a slang component of the set of keywords. To find slang sentiments, one or more slang lexicons, such as Urban Dictionary which is a web-based dictionary of slang definitions, lists of popular idioms, and SlangSD lexicon which contains slangs and their associated sentiments. If a slang term or component exists in the lexicon, the slang sentiment is collected, including collecting reviews containing the slang with high relevance score and the slang examples containing the slang from the slang lexicon source. In social media, slangs may be commonly used in short forms, and informal terms. Hence, slang polarity may be identified before sentiment classification of reviews or blogs and other content. Thus, slangs or idioms may be detected in reviews and other content, and a sentiment score assigned to each slang term. Such results may be aggregated based on a highest ranking to produce a unique sentiment score for each slang. Since slangs usage and definition may change over time and in different data sources, the data collection of slangs may be updated continuously.

After preprocessing, steps applied to detect slangs in content may include a lookup table search in conjunction with the slang lexicon sources, then filtering out all non-slang words from text to find single-words slangs, such as by using WordNet and English words lexicons. Then, single words found may be cross-referenced any existing definition in the slang lexicon source, upon which they are detected as slang, or otherwise simply a mis-spelling. Then upon slang detection, determining whether the slang appearing in the data content is consistent with its usage pattern in the lexicon source. In other words, if a slang in a review, for example, is consistent with its definition from Urban Dictionary as lexicon source. A relevancy score may be assigned to each content item containing the slang. In each content item that contains a slang, the slang is removed and compared to rest of the words in a text with the slang related words. This comparison is based on the semantic similarity between words in the content and words in the slang related words, for example, based on word2vec embeddings trained on Google News. If a word had a high semantic similarity to the related words, it may be added to a related words list. After comparing a review text with the slang related words, a list of floating numbers may be determined to represent a semantic distance between each pair of words. To assign the relevancy score to each data content item, the maximum semantic distance may be selected.

Methodology

FIG. 5 illustrates, in an example embodiment, method 500 of generating a transitory sentiment community, method 500 being performed by one or more processors 201 of server device 101. In describing the example of FIG. 5, reference is made to the examples of FIG. 1 through FIG. 4 for purposes of illustrating suitable components or elements in performing a step or sub-step being described.

Examples of method steps described herein relate to the use of server computing device 101 including transitory sentiment community logic module 105 for implementing the techniques described. According to one embodiment, the techniques are performed by server computing device 101 in response to the processor 201 executing one or more sequences of software logic instructions that constitute transitory sentiment community logic module 105. In embodiments, transitory sentiment community logic module 105 may include the one or more sequences of instructions within sub-modules including database module 210, data pre-processing module 211, sentiment analysis module 212, sarcasm modification module 213 and sentiment community generating module 214. Such instructions may be read into memory 202 from machine-readable medium, such as memory storage devices. In executing the sequences of instructions contained in database module 210, data pre-processing module 211, sentiment analysis module 212, sarcasm modification module 213 and sentiment community generating module 214 of transitory sentiment community logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

Additionally, it is further contemplated that in alternative embodiments, the techniques herein, or portions thereof, may be distributed between client, or subscriber, computing devices 102a-c and server computing device 101. For example, computing devices 102a-c may perform some portion of functionality described herein with regard to various modules of which transitory sentiment community logic module 105 is comprised, and transmit data to server 101 that, in turn, performs at least some portion of the techniques described herein.

At step 510, processor 201 executes instructions in association with database module 210 to receive data in memory 202 or a database memory 103 associated with server computing device 101, the data being extracted from a plurality of data sources.

In some embodiments, the data sources comprise publicly available data constituted of such as, but not limited to, tweet content, instant messaging content, product review content, service review content, social media posting content, and website content.

At step 520, processor 201 executes instructions of data pre-processing module 211 to pre-process the data, based on at least one of text character removal and text character replacement, to provide pre-processed data that includes a set of keywords used in a descriptive manner.

At step 530, processor 201 executes instructions of sentiment analysis module 212 to perform a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance to the at least one sentiment classification.

In an embodiment, the sentiment classification comprises a subset of the set of sentiment classifications as recognized by the training model.

In one variation, the method further includes identifying a plurality of topics based on the pre-processed data and selecting at least one topic based on a ranking of the plurality of topics.

A commonality or frequency of occurrence of some or all keywords forming the set may predominantly pertain to the selected topic in accordance with the ranking.

In another embodiment, the sarcasm sentiment is detected based at least in part on a personality trait of an author of the data from which the set of keywords is sourced or is traceable, and the pre-processing further comprises pre-processing data of the personality trait of the author, to detect a sarcasm sentiment likelihood factor. The sarcasm sentiment likelihood factor may be expressed, or quantified, as a statistical confidence level, in one embodiment.

At step 540, processor 201 executes instructions of sarcasm modification module 213 to modify the sentiment intensity rating associated with the at least one sentiment classification upon detecting a sarcasm sentiment parameter that is above a sarcasm sentiment likelihood threshold value.

In an embodiment, identifying the sentiment intensity rating includes determining a quantifiable statistical sentiment score associated with the sentiment classification, and the modifying includes either amplifying and attenuating the sentiment intensity rating of the sentiment classification.

The instructions of sarcasm modification module 213 may be further executable to modify or alter the sentiment classification to one or more alternate sentiment classifications recognized by the training model. In a further embodiment, altering the sentiment classification also includes replacing the sentiment classification with a generally contrary or opposite sentiment classification when sarcasm sentiment is detected above a certain threshold statistical confidence level. By way of illustration and examples, where the sentiment classification related to a product or services review as expressed is originally interpreted as "delighted", then a generally contrary or opposite sentiment classification applied in generating the sentiment community in lieu of "delighted" might be "disappointed"; where the sentiment classification as expressed is originally interpreted as "satisfied", then a generally contrary or opposite sentiment classification applied in generating the sentiment community in lieu of "satisfied" might be "dissatisfied"; where the sentiment classification as expressed is originally interpreted as "trust", a generally contrary or opposite sentiment classification applied in generating the sentiment community in lieu of "trust" might be "mistrust" or "distrust".

In an embodiment, the method further comprises modifying the sentiment intensity rating by either amplifying, or attenuating, the sentiment intensity rating upon detecting existence of a slang component of the set of keywords.

At step 550, processor 201 executes instructions of sentiment community generation module 214 to generate the transitory sentiment community based at least in part on the at least one sentiment classification and the modified sentiment intensity rating.

In one variation, generating the transitory sentiment community may be based on applying a sentiment intensity threshold to the modified sentiment intensity rating, whereupon the generating is initiated upon the sentiment intensity rating crossing above, or below in another embodiment, the modified sentiment intensity threshold.

In an embodiment, the sentiment classification comprises a subset of the set of sentiment classifications, and the method further comprises generating the transitory sentiment community based on a sentiment intensity threshold associated with respective ones of the subset of sentiment classifications.

In some variations, the transient sentiment community, including physical user interface representations thereof, may be generated by sentiment community generating module 114 in conjunction with client interface module 106 of client computing device 102 at a display interface or a user interface of client computing device 102.

Figure 6:
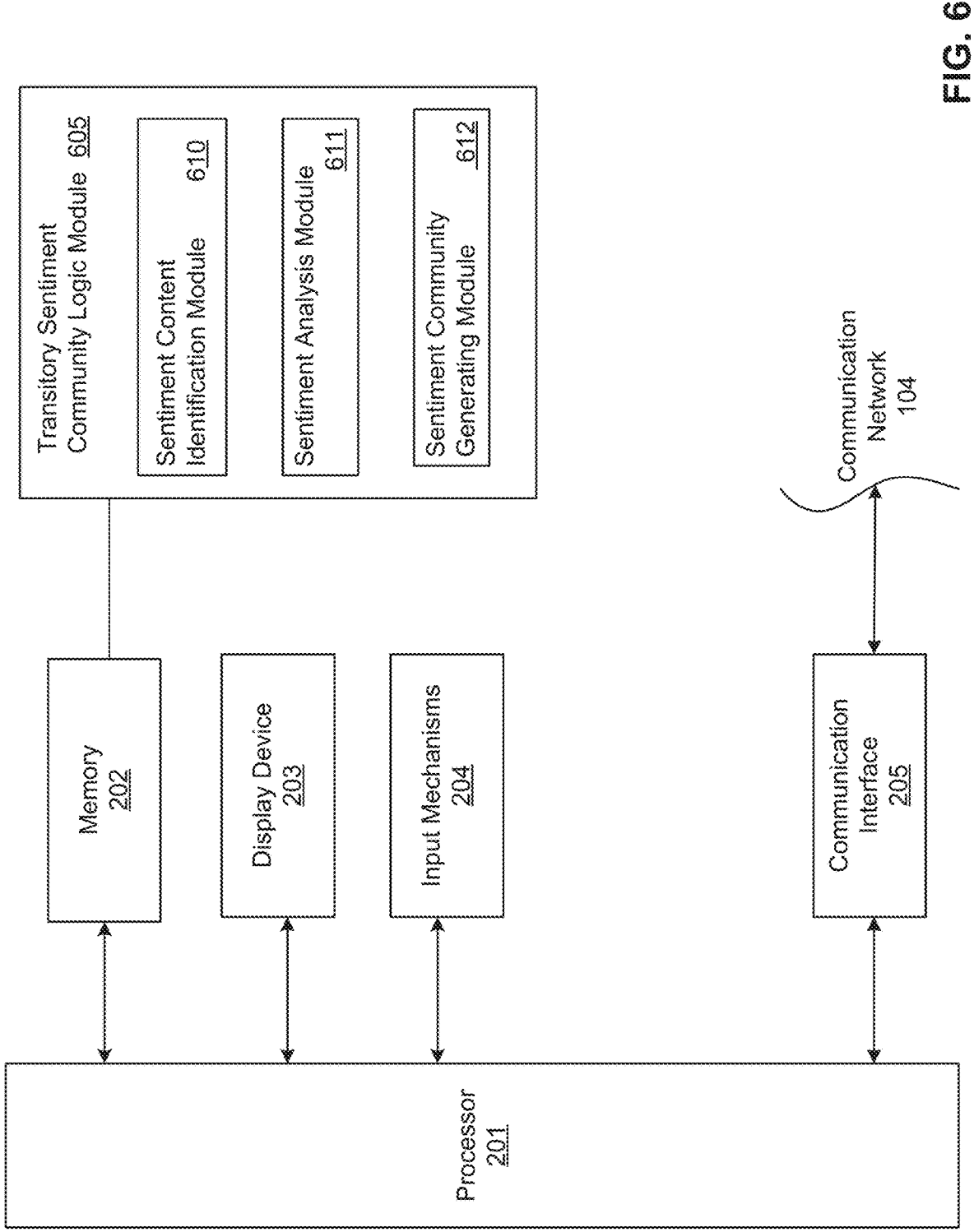
FIG. 6 illustrates, in an example embodiment, an architecture of a server computing system generating a transitory sentiment community.

FIG. 6 illustrates, in an example embodiment, an architecture 600 of a server computing system generating a transitory sentiment community. In describing the embodiments of FIG. 6, the examples of FIG. 1 through FIG. 5 are incorporated for purposes of illustrating suitable components or elements for performing techniques described herein. Non-transient memory 202, in embodiments, includes transitory sentiment community logic module 605 comprised of instructions executable in processor 201. In embodiments, transitory sentiment community logic module 605 includes sentiment content identification module 610, sentiment analysis module 611, and sentiment community generating module 612. Among other aspects, a user can define their subject of interest, apply transitory sentiment community logic module 605 to identify short phrases which represent that subject of interest, then apply this as input to generate a sentiment, or emotionality, intensity rating used to generate a transitory sentiment community that is defined in accordance with the sentiment, or emotionality, intensity rating.

Sentiment content identification module 610 includes processor-executable instructions stored in non-transient memory 202 to identify, in accordance with a supervised trained model, within agglomerated social media content data, content associated with a subject of interest and characterized in accordance with either one of a sentiment expressive usage or not a sentiment expressive usage, the subject of interest defined in accordance with at least one text character string.

Sentiment analysis module 611 includes processor-executable instructions stored in non-transient memory 202 to perform, based on an unsupervised trained model in conjunction with content identified as associated with the sentiment expressive usage, a sentiment analysis that determines a sentiment intensity rating associated with at least a portion of the agglomerated social media content data.

Sentiment community generating module 612 includes processor-executable instructions stored in non-transient memory 202 to generate a transitory sentiment community that is defined, at least partly, based on the sentiment intensity rating.

Training the neural network models to enable deployment of aspects transitory sentiment community logic module 605 as described herein can utilize a 2-phase classification process to learn key content associated with contexts defined in accordance with a subject of interest, which have emotional intensity, or expressiveness, and then extrapolate and build the relationship between phrases and key contexts, based on emotional intensity rating or level.

In some embodiments, the neural network can be such as, but not necessarily limited to, a convolution neural network and a recurrent neural network. In training models described herein, embodiments include a supervised or semi-supervised learning using emotional data words and perform a check to ensure the word is being used to express emotion or sentiment within the text or sentence, as opposed to merely descriptive use without emotional expressiveness being conveyed within a text phrase or sentence. The neural network model can be trained in accordance with a technique that utilizes predetermined phrases, or priors, which define the desired meaning for a given set of topics as input to an unsupervised deep learning stack that builds the relationship between topics of interest and similar topics found in agglomerated social media content. The training model builds a list of similar phrases with context in this manner, classifying text content as either expressive experiences or emotional contexts, or otherwise classifying text content as not emotional- or sentiment-expressive.

In the particular embodiment of a convolution neural network model, the convolution operation typically embodies two parts of inputs: (i) input feature map data, and (ii) a weight (also referred to as output filter, or kernel). Given the input channel data with W(Width)×H(Height)×IC data cube and R×S×ICa filter, the output of direct convolution may be formulated as:

$$y_{w,h} = \sum_{r=0}^{R-1}\sum_{s=0}^{S-1}\sum_{c=0}^{C-1} x_{(w+r),(h+s),c} * W_{r,s,c}$$

where:
X=input data/input feature/input feature map
w=width of the input or output data
h=height of the input or output data
R=weight size (width)
S=weight size (height)
C=number of input channel
Y=output data/output feature/output feature map
W=filter/kernel/weight For each input channel, the filter, or weight, are convoluted with data and generates output data. The same location of data of all the input channels are summed together and generate an output data channel.

A weight is applied to detect a particular defect feature or type based on an input data stream of patient medical condition parameters.

Each output channel of the convolution model is represented by an output filter or weight used to detect one particular feature or pattern of the input feature data stream. Convolution networks may be constituted of many output filters or weights, arranged in matrix configurations, for each layer of the convolution model corresponding to respective features or patterns in the input data stream.

In embodiments, the training model is implemented in accordance with a neural network configured with a set of input layers, an output layer, and one or more intermediate layers connecting the input and output layers. In embodiments, the input layers are associated with input features that relate to content data agglomerated from various and disparate sources of social media content.

In embodiments, either of the supervised and the unsupervised trained model is trained, in accordance with a neural network machine learning model comprising a set of input layers interconnected via a set of intermediate layers to an output layer, the machine learning neural network model being instantiated in the processor based at least in part upon processor-executable instructions being accessed by the processor from a non-transitory memory.

In embodiments, the supervised and the unsupervised trained model are trained in accordance with a neural network machine learning model having a set of input layers interconnected via a set of intermediate layers to an output layer. The machine learning neural network model is instantiated in the processor 201 based at least in part upon processor-executable instructions being accessed by processor 201 from a non-transitory memory 202.

In one embodiment, training the supervised trained model includes providing the agglomerated social media content to the input layers of the machine learning neural network, the intermediate layers being configured in accordance with an initial matrix of weights. Then, training the machine learning neural network, upon providing of content predetermined as being associated with the subject of interest to the output layer, based upon recursively adjusting the initial matrix of weights by backpropagation in diminishment of an error matrix computed at the output layer.

In an embodiment, training the supervised trained model includes providing content identified as being associated with the subject of interest to the set of input layers of the machine learning neural network, the set of intermediate layers being configured in accordance with an initial matrix of weights. Then, training the machine learning neural network based at least in part upon recursively adjusting the initial matrix of weights by backpropogation in diminishment of an error matrix computed in accordance with a sentiment intensity rating generated at the output layer.

FIG. 7 illustrates an example embodiment of a method 700 of operation in generating a transitory sentiment community. Examples of method steps described herein relate to the use of server 101 for implementing the techniques described. Method 700 embodiment depicted is performed by one or more processors 201 of server computing device 101. In describing and performing the embodiments of FIG. 7, the examples of FIG. 1 through FIG. 6 are incorporated for purposes of illustrating suitable components or elements for performing a step or sub-step being described. According to one embodiment, the techniques are performed by transitory sentiment community logic module 605 of server 601 in response to the processor 201 executing one or more sequences of software logic instructions that constitute transitory sentiment community logic module 605.

In embodiments, transitory sentiment community logic module 605 can include the one or more sequences of instructions within sub-modules including sentiment content identification module 610, sentiment analysis module 611, and sentiment community generating module 612. Such instructions may be read into memory 202 from machine-readable medium, such as memory storage devices. In executing the sequences of instructions of sentiment content identification module 610, sentiment analysis module 611, and sentiment community generating module 612 of transitory sentiment community logic module 605 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

At step 710, in accordance with executing instructions comprising content identification module 610 in processor 201, identifying, in accordance with a supervised trained model, within agglomerated social media content data, content associated with a subject of interest and characterized in accordance with one of a sentiment expressive usage and not a sentiment expressive usage, the subject of interest defined in accordance with at least one text character string.

In embodiments the agglomerated social media content includes any combination of a hashtag, a twitter handle, an emoticon, at least a portion of a website content, a product brand name, a company name, a product feature, a message exchange, an image, a video portion, or a text string produced via a speech to text conversion of at least a portion of an audio file source. In other variations, content can be agglomerated based on sources across more than social media content, including news articles and other website content.

At step 720, in accordance with executing instructions of sentiment analysis module 611 in processor 201, performing, based on an unsupervised trained model in conjunction with content associated with the sentiment expressive usage, a sentiment analysis that determines a sentiment intensity rating associated with at least a portion of the agglomerated social media content data.

At step 730, in accordance with executing instructions comprising sentiment community generating module 612 in processor 201, generating the transitory sentiment community based at least in part on the sentiment intensity rating.

In another embodiment, generating the transitory sentiment community can be further based on the subject of interest as embedded into the agglomerated social media content data.

In yet another variation, generating the transitory sentiment community can be based on either amplifying or attenuating the sentiment intensity rating. For instance, and without limitation to illustrative instances, generating the transitory sentiment community based on amplifying or attenuating the sentiment intensity rating based a personality trait associated with an author of the content associated with the sentiment expressive usage, or upon detecting existence of a slang expression in the content associated with the sentiment expressive usage.

In some embodiments, generating the transitory sentiment community is based on applying a sentiment intensity threshold to the sentiment intensity rating, the sentiment intensity rating being either above or below the sentiment intensity threshold. Some aspects can allow for dynamically adjusting the sentiment intensity threshold, as the sentiment community experiences progressions from one sentiment being experienced, in accordance with the determined sentiment ratings, as being predominant followed by transition to another different sentiment being predominant. In other aspects, determinations of sentiment intensity ratings can be determined and established in accordance with predetermined time periods or timings.

Other embodiments can include generating the transitory sentiment community based on many sentiment classifications, each sentiment classification having a respective sentiment intensity threshold, and modifying or combining at least one sentiment classification with one or more other sentiment classifications recognized by the unsupervised training model.

Figure 8:
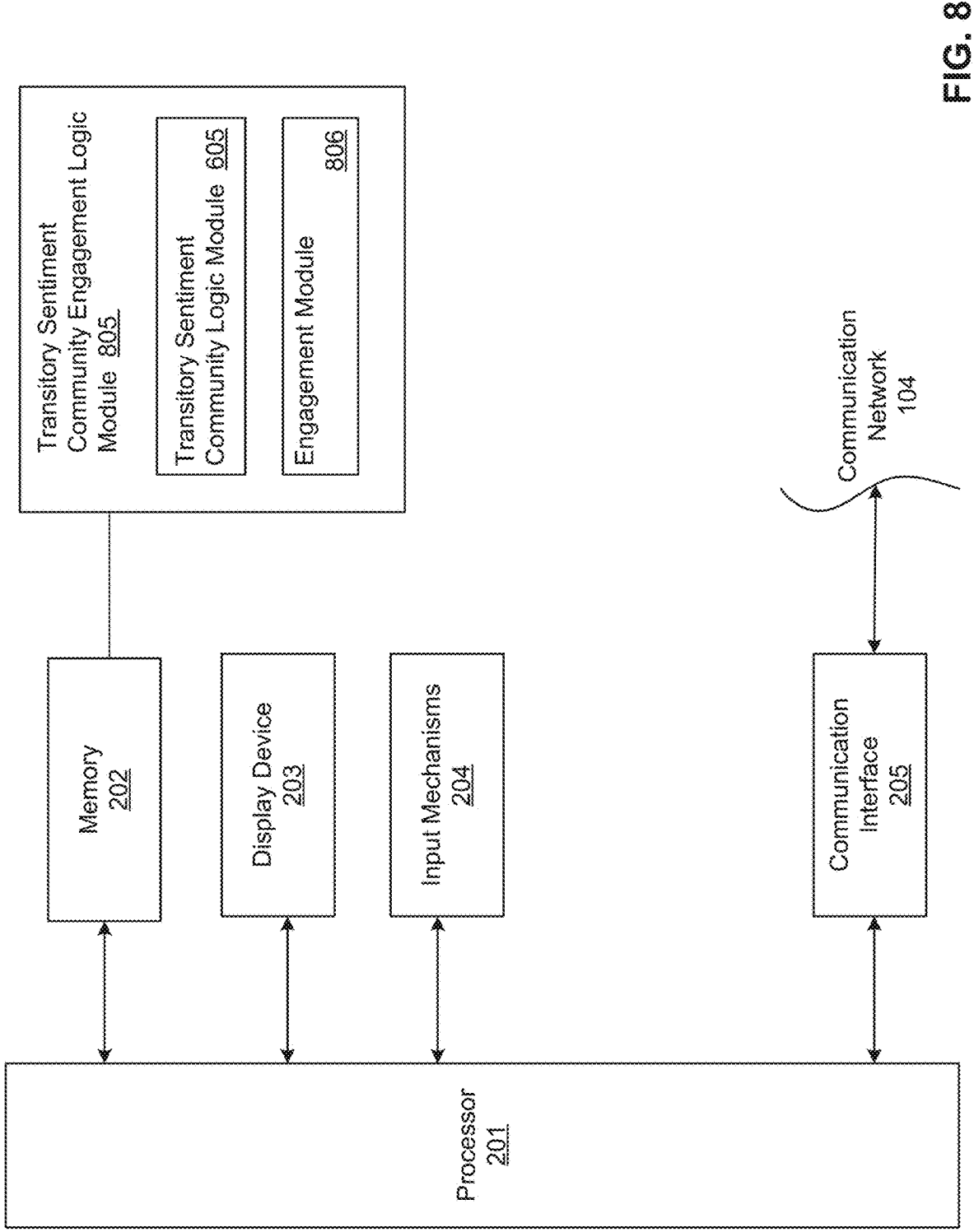
FIG. 8 illustrates, in an example embodiment, an architecture of a server computing system in engaging a transitory sentiment community.

FIG. 8 illustrates example embodiment architecture of server computing system 801 in engaging a transitory sentiment community. In describing the embodiments of FIG. 8, the examples of FIG. 1 through FIG. 7 are incorporated for purposes of illustrating suitable components or elements for performing techniques described herein. Non-transient memory 202, in embodiments, includes transitory sentiment community engagement logic module 805 comprised of logic instructions executable in processor 201. In embodiments, transitory sentiment community engagement logic module 805 includes transitory sentiment community logic module 605 and engagement module 806. Among other aspects, engagement module 806 provides capability, in conjunction with transitory sentiment community logic module 605, for identifying, responsive to monitoring generation of a transitory sentiment community, a critical engagement juncture being reached. The transitory sentiment community may be generated based on content consumers collectively providing a sentiment expressive usage associated with a subject of interest, with the sentiment expressive usage characterized in accordance with a sentiment intensity rating using techniques described with regard to FIGS. 1 through 7 herein. Responsive to the critical engagement juncture being reached, engagement module 806 provides capability, in conjunction with transitory sentiment community logic module 605, in initiating an engagement action directed to at least some of the content consumers identified, in some embodiments in one or more social media channels or platforms being used, as contributing to, or providing, a collective sentiment intensity rating across a given transient sentiment community being generated.

As used herein, the critical engagement juncture refers to a particular point in time or a moment at which it may become especially advantageous to trigger an engagement action, such as an offer for commercial or other engagements, to one or more members of the collective of content consumers forming the transient sentiment community as identified. In embodiments, the critical engagement juncture can be modeled or determined as particular point or portion along a geometric curve or pattern representing mathematical aspects of sentiment intensity rating changes with time once the transient sentiment community is identified or formed. In embodiments, the geometric pattern may be a plot of sentiment intensity rating values along a vertical (or Y-) axis with time measured in minutes, hours or days, in some embodiments, along a horizontal (or X-) axis in a two-dimensional graphical plot or curve. In such representations, sentiment intensity rating reaching a certain threshold value, whether from trending upwards or downwards relative to a threshold value or setting, may be used as the critical engagement juncture. In some embodiments, a threshold rate of change in the sentiment intensity rating over time measured in minutes, hours or days, in some embodiments, may be used to decide or conclude that a critical engagement juncture has been reached. Continuing in regard to the geometric pattern analysis rendered in the 2-dimensional curve representation, one or combination of both the rate of change of the sentiment intensity rating over any portion of the period of time, as well as a change in slope of the sentiment intensity rating over the portion of the period of time that is associated with an inflection point, a global or local maximum, and a local or global minimum established in the two-dimensional plot of the sentiment intensity rating over the period of time, may be applied to identify that, or conclude, that the critical juncture has been reached. Such a local maximum or minimum may refer to a more limited period of time during changes in the sentiment intensity rating, as opposed to a global maximum or minimum calculated over a wider period of time with respect to the two-dimensional curve representation of sentiment intensity rating versus time plot. In either case of a local or global maximum or minimum, such points identified in time can be taken as an indication of a prime moment for capturing heightened sentiment intensity in order to opportunistically present engagement offers to content consumers, to the subject of interest at hand if the subject of interest refers to a person or entity, or in the case where the subject of interest refers to a product or service, to trigger engagement actions, including offers, to such third parties as well.

In some embodiments, the engagement action may be an offer, commercial or otherwise, directed to all or some of the content consumers who collectively constitute the transitory sentiment community. The engagement action, in some embodiments, may be transmitted to a client device, such a mobile phone or similar communicatively connected device, used by respective content consumers that constitute, and are contributing to, the transitory sentiment community as expressed in accordance with a collective sentiment intensity rating. The engagement action transmitted to the content consumers, in embodiment, may be manifested at a user interface of the client devices via a soft touch button or icon, or a hyperlink presented thereon, soliciting a response or choice from any given content consumer in regard to the subject of interest associated with generation or creation of the transient sentiment community. Selection of offers, in embodiments, at the user interface of client devices of content consumers may be communicatively linked to online payment platforms and product inventory platforms to enable seamless consummation of commercial purchases. In related or other embodiments, upon reaching the critical engagement juncture, a second engagement action may be triggered that includes an offer communicated to one or more entities identified as being a provider of the subject of interest or being associated, commercially, by agency, or otherwise, with the subject of interest that is driving the sentiment expression being generated by content consumers.

Figure 9:
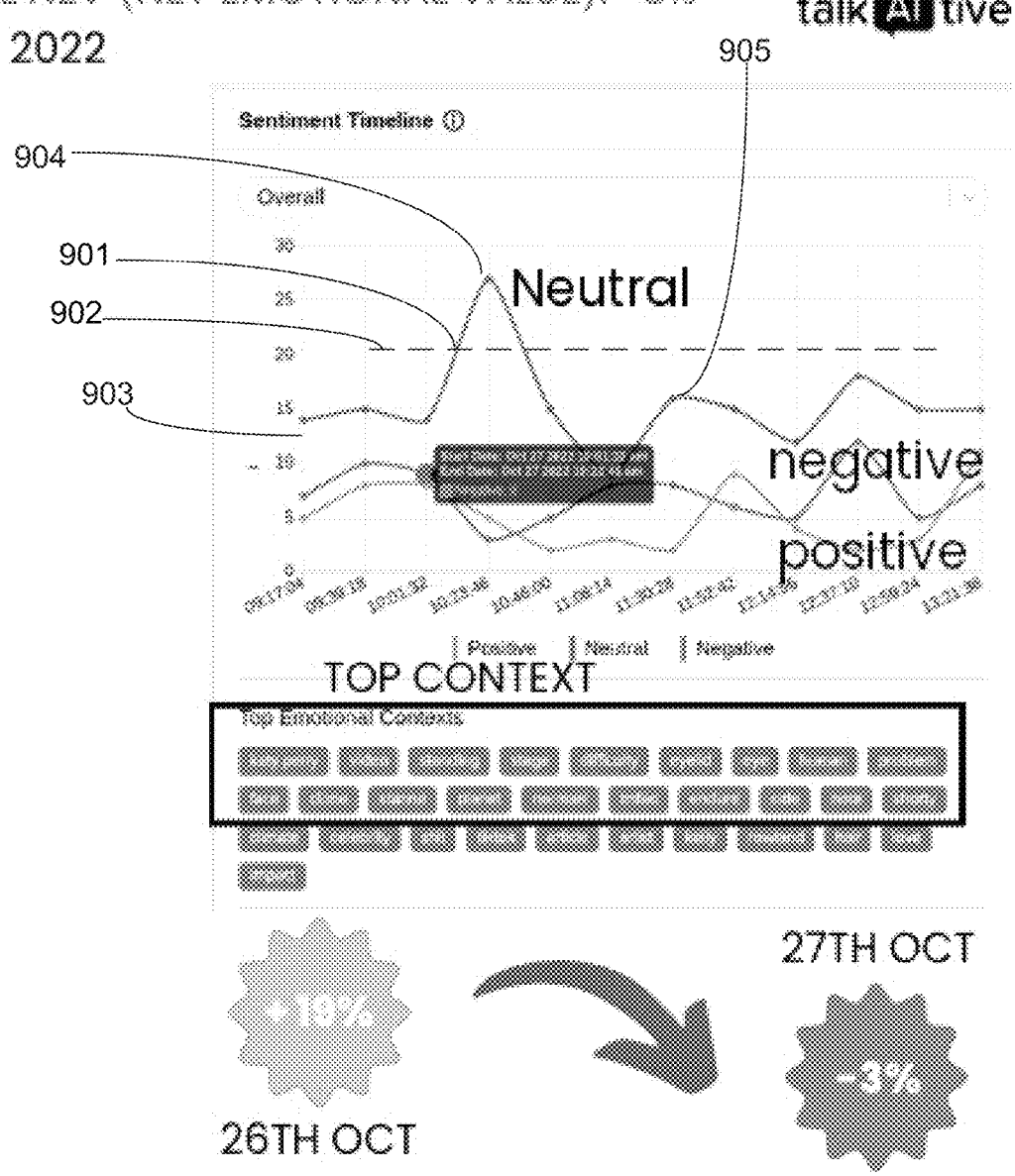
FIG. 9 illustrates an example embodiment in engaging a transitory sentiment community.

FIG. 9 illustrates example embodiment 900 in engaging a transitory sentiment community. In an embodiment depicted, the transient sentiment community represented in accordance with Y-axis 903 is tracked as it is created or generated over a period of one day, for example from October 26 to October 27 for a given subject of interest. In accordance with techniques for identifying critical engagement juncture 901 in accordance with sentiment intensity threshold 902, or in alternate embodiments global maximum 904 or local minimum 905 as described herein, a gamut of positive, neutral and negative sentiments being expressed collectively by content consumers may be monitored for the given transitory sentiment community being created or generated.

FIG. 10 illustrates example embodiment method of operation 1000 in engaging a transitory sentiment community.

At step 1010, identifying, responsive to monitoring generation of the transitory sentiment community, critical engagement juncture 901 being reached, the transitory sentiment community including a collective of content consumers, ones of the collective of content consumers providing a sentiment expressive usage associated with a subject of interest, the sentiment expressive usage characterized in accordance with a sentiment intensity rating.

At step 1020, initiating, responsive to critical engagement juncture 901 being reached, an engagement action directed to at least a subset of the ones of the collective of content consumers.

In embodiments, critical engagement juncture 901 is identified in accordance with a sentiment intensity threshold 902 that is established in accordance with a predetermined sentiment intensity rating or a geometric pattern analysis of a trend in the sentiment intensity rating over a period of time. In embodiments, the geometric pattern analysis may be based on at least one of (i) a rate of change of the sentiment intensity rating over at least a portion of the period of time, and (ii) a change in slope reflecting a change in rate of change of the sentiment intensity rating over a portion of the period of time that is associated with an inflection point, a global or local maximum, or a local or global minimum, established in a two-dimensional plot of the sentiment intensity rating over the portion of the period of time. In accordance with techniques for identifying critical engagement junctures described herein, a gamut of positive, neutral and negative sentiments being expressed collectively by content consumers may be monitored for a transitory sentiment community being created or generated.

In some aspects, the engagement action may be an offer, commercial or otherwise, directed to all or some of the content consumers who collectively constitute the transitory sentiment community. In one aspect the engagement action seeks to engage the user in a survey, with survey response options rendered at a user interface of a client device such as a mobile phone being used or associated with given ones of the content consumers forming the transitory sentiment community generated and monitored. In related or other embodiments, upon reaching the critical engagement juncture, a second engagement action may be triggered, simultaneously or in close temporal proximity, that includes an offer communicated to one or more entities identified as being a provider of the subject of interest or being associated, commercially, by agency, or otherwise, with the subject of interest that is driving the sentiment expression being generated by content consumers. In embodiments, the subject of interest may be a product review, and with offers to purchase at discounted rates or other advantageous terms being triggered and directed to content consumers, while offers directed to producer entities of that product may indicate characteristics of the collective of content consumers who constitute the transitory sentiment community at the time the critical engagement juncture is reached, that product marketing efforts may be directed to, collectively or otherwise.

As used herein, the critical engagement juncture refers to a particular point in time or a moment at which it may become especially advantageous to trigger an engagement action, such as an offer for commercial or other engagements, to one or more members of the collective of content consumers forming the transient sentiment community as identified. In embodiments, the critical engagement juncture can be modeled or determined as particular point or portion along a geometric curve or pattern representing mathematical aspects of sentiment intensity rating changes with time once the transient sentiment community is identified or formed. In embodiments, the geometric pattern may be a plot of sentiment intensity rating values along a vertical (or Y-) axis with time measured in minutes, hours or days, in some embodiments, along a horizontal (or X-) axis in a 2-dimensional graphical curve. In such representations, sentiment intensity rating reaching a certain threshold value, whether from trending upwards or downwards relative to a threshold value or setting, may be used as the critical engagement juncture. In some embodiments, a threshold rate of change in the sentiment intensity rating over time measured in minutes, hours or days, in some embodiments, may be used to decide or conclude that a critical engagement juncture has been reached. Continuing in regard to the geometric pattern analysis rendered in the two-dimensional plot or curve representation, one or a combination of both the rate of change of the sentiment intensity rating over any portion of the period of time, as well as a change in slope of the sentiment intensity rating over the portion of the period of time that is associated with an inflection point, a global or local maximum, and a local or global minimum established in the two-dimensional plot of the sentiment intensity rating over the period of time, may be applied to identify that, or conclude, that the critical juncture has been reached. Such a local maximum or minimum may refer to a more limited period of time during changes in the sentiment intensity rating, as opposed to a global maximum or minimum calculated over a wider period of time with respect to the two-dimensional curve representation of sentiment intensity rating versus time plot. In either case of a local or global maximum or minimum, such points identified in time can be taken as an indication of a prime moment for capturing heightened sentiment intensity in order to opportunistically present engagement offers to content consumers, to the subject of interest at hand if the subject of interest refers to a person or entity, or in the case where the subject of interest refers to a product or service, to trigger engagement actions, including offers, to such third parties as well.

In some embodiments, the engagement action may be an offer, commercial or otherwise, directed to all or some of the content consumers who collectively constitute the transitory sentiment community. The engagement action, in some embodiments, may be transmitted to a client device, such a mobile phone or similar communicatively connected device, used by respective content consumers that constitute, and are contributing to, the transitory sentiment community as expressed in accordance with a collective sentiment intensity rating. The engagement action transmitted to the content consumers, in embodiment, may be manifested at a user interface of the client devices via a soft touch button or icon, or a hyperlink presented thereon, soliciting a response or choice from any given content consumer in regard to the subject of interest associated with generation or creation of the transient sentiment community. In one aspect the engagement action seeks to engage the user in a survey, with survey response options rendered at a user interface of a client device such as a mobile phone being used or associated with given ones of the content consumers forming the transitory sentiment community generated and monitored. In related or other embodiments, upon reaching the critical engagement juncture, a second engagement action may be triggered that includes an offer communicated to one or more entities identified as being a provider of the subject of interest or being associated, commercially, by agency, or otherwise, with the subject of interest that is driving the sentiment expression being generated by content consumers.

It is contemplated that, in regard to illustrative examples herein, where a machine learning method, or training method, is described as being based on an unsupervised learning technique, a supervised or a semi-supervised technique may alternately be applied; and where a machine learning method is described as based on a supervised learning technique, an unsupervised or partly unsupervised learning technique may alternately be used.

It is contemplated that embodiments described herein extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. For example, in illustrative examples where a machine learning method is described as being based on an unsupervised learning technique, a supervised learning technique may alternately be applied. And where a machine learning method is described as based on an unsupervised learning technique, a supervised learning technique may alternately be applied. Accordingly, it is intended that the scope of the invention be defined by the following claims and their equivalents. Furthermore, it is contemplated that a particular feature described either individually or as part of an embodiment can be combined with other individually described features, or parts of other embodiments as described herein. Thus, the absence of describing combinations should not preclude the inventors from claiming rights to such combinations.

What is claimed is:

1. A method, performed in a processor of a server computing device, of engaging a transitory sentiment community, the method comprising:

identifying, responsive to monitoring generation of the transitory sentiment community, a critical engagement juncture being reached, the transitory sentiment community including a collective of content consumers, ones of the collective of content consumers providing a sentiment expressive usage associated with a subject of interest, the sentiment expressive usage characterized in accordance with a sentiment intensity rating; and initiating, responsive to the critical engagement juncture being reached, an engagement action directed to at least a subset of the ones of the collective of content consumers;

wherein the sentiment intensity rating is determined based on with a sentiment analysis performed in accordance with a trained a machine learning model in conjunction with social media content, the trained machine learning model being trained in accordance with a set of input layers interconnected via a set of intermediate layers to an output layer, the machine learning model being instantiated in the processor based at least in part upon processor-executable instructions accessed by the processor from a non-transitory memory, and wherein training the trained machine learning model comprises providing social media content relating to the subject of interest to the set of input layers of the machine learning model, the set of intermediate layers configured in accordance with an initial matrix of weights and being based at least in part upon recursively adjusting the initial matrix of weights by backpropagation in diminishment of an error matrix computed at the output layer.

2. The method of claim 1 wherein the subject of interest relates to social media content comprising one or more of: a hashtag, a twitter handle, an emoticon, at least a portion of a website content, a product brand name, a product feature, a message exchange, an image, a video portion, and a text string produced via a speech to text conversion of at least a portion of an audio file source.

3. The method of claim 2 wherein generation of the transitory sentiment community is based on at least one of amplifying and attenuating the sentiment intensity rating based in part on at least one of: (1) a personality trait associated with an author of the content associated with the sentiment expressive usage, and (ii) upon detecting existence of a slang expression in the social media content.

4. The method of claim 1 wherein the critical engagement juncture is identified in accordance with a sentiment intensity threshold that is established in accordance with at least one of (1) a predetermined sentiment intensity rating and (ii) a geometric pattern analysis of a trend in the sentiment intensity rating over a period of time.

5. The method of claim 4 wherein the geometric pattern analysis comprises at least one of (i) a rate of change of the sentiment intensity rating over at least a portion of the period of time, and (ii) a change in slope of the sentiment intensity rating over the at least a portion of the period of time that is associated with one of an inflection point, a global or local maximum, and a local or global minimum established in a two-dimensional plot of the sentiment intensity rating over the at least a portion of the period of time.

6. The method of claim 1 wherein the engagement action comprises an offer directed to the at least a subset of the ones of the collective of content consumers.

7. The method of claim 6 wherein the engagement action is a first engagement action, and further comprising a second engagement action that includes an offer communicated to one or more entities identified as being at least one of (i) a provider of the subject of interest and (ii) associated with the subject of interest.

8. A server computing system comprising:
a processor;
a memory storing a set of instructions, the instructions when executed in the processor causing operations comprising:

identifying, responsive to monitoring generation of a transitory sentiment community, a critical engagement juncture being reached, the transitory sentiment community including a collective of content consumers, ones of the collective of content consumers providing a sentiment expressive usage associated with a subject of interest, the sentiment expressive usage characterized in accordance with a sentiment intensity rating; and initiating, responsive to the critical engagement juncture being reached, an engagement action directed to at least a subset of the ones of the collective of content consumers;

wherein the sentiment intensity rating is determined based on with a sentiment analysis performed in accordance with a trained a machine learning model in conjunction with social media content, the trained machine learning model being trained in accordance with a set of input layers interconnected via a set of intermediate layers to an output layer, the machine learning model being instantiated in the processor based at least in part upon processor-executable instructions accessed by the processor from a non-transitory memory, and wherein training the trained machine learning model comprises providing social media content relating to the subject of interest to the set of input layers of the machine learning model, the set of intermediate layers configured in accordance with an initial matrix of weights and being based at least in part upon recursively adjusting the initial matrix of weights by backpropagation in diminishment of an error matrix computed at the output layer.

9. The server computing system of claim 8 wherein the subject of interest relates to social media content comprising one or more of: a hashtag, a twitter handle, an emoticon, at least a portion of a website content, a product brand name, a product feature, a message exchange, an image, a video portion, and a text string produced via a speech to text conversion of at least a portion of an audio file source.

10. The server computing system of claim 9 wherein generation of the transitory sentiment community is based on at least one of amplifying and attenuating the sentiment intensity rating based in part on at least one of: (i) a personality trait associated with an author of the content associated with the sentiment expressive usage, and (ii) upon detecting existence of a slang expression in the social media content.

11. The server computing system of claim 8 wherein the critical engagement juncture is identified in accordance with a sentiment intensity threshold that is established in accordance with at least one of (i) a predetermined sentiment intensity rating and (ii) a geometric pattern analysis of a trend in the sentiment intensity rating over a period of time.

12. The server computing system of claim 11 wherein the geometric pattern analysis comprises at least one of (i) a rate of change of the sentiment intensity rating over at least a portion of the period of time, and (ii) a change in slope of the sentiment intensity rating over the at least a portion of the period of time that is associated with one of an inflection point, a global or local maximum, and a local or global minimum established in a two-dimensional plot of the sentiment intensity rating over the at least a portion of the period of time.

13. The server computing system of claim 8 wherein the engagement action comprises an offer directed to the at least a subset of the ones of the collective of content consumers.

14. The server computing system of claim 13 wherein the engagement action is a first engagement action, and further comprising a second engagement action that includes an offer communicated to one or more entities identified as being at least one of (i) a provider of the subject of interest and (ii) associated with the subject of interest.

* * * * *